(12) United States Patent
Glisic et al.

(10) Patent No.: US 11,647,123 B2
(45) Date of Patent: May 9, 2023

(54) VIRTUAL CONFERENCING SYSTEM WITH LAYERED CONVERSATIONS

(71) Applicant: Mycelium, Inc., Oakland, CA (US)

(72) Inventors: Leo Glisic, Oakland, CA (US); Jesse Katz, Morgan Hill, CA (US); Dustin Maltz, Loma Linda, CA (US)

( * ) Notice: Subject to any disclaimer, the term of this patent is extended or adjusted under 35 U.S.C. 154(b) by 0 days.

(21) Appl. No.: 17/562,649

(22) Filed: Dec. 27, 2021

(65) Prior Publication Data

US 2022/0232128 A1 Jul. 21, 2022

Related U.S. Application Data

(60) Provisional application No. 63/138,231, filed on Jan. 15, 2021.

(51) Int. Cl.
| | | |
|---|---|---|
| *G06F 15/16* | (2006.01) | |
| *H04M 3/56* | (2006.01) | |
| *H04L 65/403* | (2022.01) | |

(52) U.S. Cl.
CPC ........ *H04M 3/568* (2013.01); *H04L 65/4046* (2013.01)

(58) Field of Classification Search
None
See application file for complete search history.

(56) References Cited

U.S. PATENT DOCUMENTS

| | | | | |
|---|---|---|---|---|
| 7,840,668 | B1 * | 11/2010 | Sylvain | H04L 67/131 |
| | | | | 709/224 |
| 8,243,903 | B1 * | 8/2012 | Hyndman | H04M 3/568 |
| | | | | 709/204 |
| 10,979,671 | B1 * | 4/2021 | McElroy | H04N 7/157 |
| 11,070,768 | B1 * | 7/2021 | Krol | G06T 19/003 |
| 11,522,925 | B2 | 12/2022 | Morris et al. | |
| 2003/0001890 | A1 * | 1/2003 | Brin | H04L 12/1822 |
| | | | | 715/753 |
| 2005/0088981 | A1 | 4/2005 | Woodruff et al. | |

(Continued)

FOREIGN PATENT DOCUMENTS

| | | | | |
|---|---|---|---|---|
| DE | 602004004824 T2 * | 6/2007 | | G10L 17/005 |
| WO | WO-2010071984 A1 * | 7/2010 | | A63F 13/10 |

*Primary Examiner* — Phyllis A Book
(74) *Attorney, Agent, or Firm* — Jonathan D Feuchtwang

(57) ABSTRACT

A virtual communication system including logic for supporting layered conversations, the system comprising: at least two computers communicating to one another over a communications medium, where each computer represents a User, each computer including a display, audio input, audio output, video input (such as a camera), memory, data storage, and a processor, a knowledge base stored in memory, the knowledgebase containing an identifier identifying each conversation associated with a given user, the knowledgebase storing information identifying each participant in each of the conversations, the knowledgebase storing information identifying the type of each conversation associated with the given one of the at least two computers, where each User may participate in multiple simultaneous conversations; and layered conversation logic executed by the processor, the layered conversation logic controlling a volume and a visual layout of each participant in each conversation in which the User participates in accordance with the conversation type.

20 Claims, 12 Drawing Sheets

(56) References Cited

U.S. PATENT DOCUMENTS

| | | | |
|---|---|---|---|
| 2007/0282989 A1* | 12/2007 | Milstein | H04M 7/006 709/223 |
| 2009/0249228 A1* | 10/2009 | Cheng | G06F 3/0481 715/758 |
| 2012/0147123 A1* | 6/2012 | Lian | H04N 7/15 348/E7.083 |
| 2014/0118474 A1 | 5/2014 | Fluhr et al. | |
| 2016/0088259 A1 | 3/2016 | Anderson | |
| 2016/0142677 A1* | 5/2016 | Leibovich | H04L 65/403 348/14.08 |
| 2016/0269504 A1* | 9/2016 | Johar | H04L 67/141 |
| 2020/0162616 A1* | 5/2020 | Bender | H04M 1/72454 |
| 2020/0404031 A1* | 12/2020 | Fahlgren | H04L 65/1093 |
| 2022/0086203 A1* | 3/2022 | Morris | H04L 65/403 |

\* cited by examiner

Starting a Convo: example of peer-to-peer implementation

Starting a Convo: example of client-server implementation

VIRTUAL CONFERENCING SYSTEM WITH LAYERED CONVERSATIONS

FIELD OF THE INVENTION

The invention relates to virtual communications applications, and more particularly to a communications platform which enables multiple layers of conversations.

BACKGROUND

A big limitation in today's virtual communication applications (such as video conferencing applications, voice-only applications, or gaming environments with voice and/or video capabilities) is the inability to have dynamic, fluid conversations. Users' video tiles are generally laid out in a grid pattern and they are all engaged in one single conversation, regardless of how many users are in the videoconferencing session. If two users speak at a time, the other users in the session will hear them both at the same time and it will sound as if they are talking over each other, making it difficult to understand what either user is saying. As a result, users have to be careful to take turns speaking, one at a time. This is equally frustrating for speakers and listeners, and disrupts the natural flow of conversations that are inhibited by these limitations.

In contrast, we observe that at in-person gatherings, people exhibit tendencies to self-organize into smaller groups and conversations that are occurring simultaneously. Additionally, we observe that people frequently make side comments or engage in side conversations within a group conversation. We refer to this dynamic as sidebar conversations. Throughout this disclosure the term "conversation" is intended to refer to a verbal conversation as opposed to written or textual conversations. The present invention addresses the shortcomings of conventional virtual communications platforms as follows.

SUMMARY OF THE INVENTION

Example 1

A virtual communication system including logic for supporting layered conversations, the system comprising:

at least two computers communicating to one another over a communications medium, where each computer represents a User, each computer including a display, audio input, audio output, video input (such as a camera), memory, data storage, and a processor, a knowledge base stored in memory, the knowledgebase containing an identifier identifying each conversation associated with a given user, the knowledgebase storing information identifying each participant in each of the conversations, the knowledgebase storing information identifying the type of each conversation associated with the given one of the at least two computers, where each User may participate in multiple simultaneous conversations; and layered conversation logic executed by the processor, the layered conversation logic controlling a volume of each participant in each conversation in which the User participates in accordance with the conversation type.

Example 2

The virtual communication system of Example 1, wherein a given User may communicate with one or more other Users in a conversation type selected from the group (Layer 1, Layer 2, and Layer 3), wherein LCX1, X2, . . . XN refers to a Layer C communication between Users X, X2, . . . XN, wherein if User X1 is in a Layer 1 conversation with User X2 then they are not in Layer 2 or Layer 3 conversation, wherein if User X1 is in Layer 2 conversation with User X2 then User X1 and User X2 are in both Layer 1 and Layer 2 conversations but not in a Layer 3 conversation, and if User X1 is in a Layer 3 conversation with User X2 then User X1 and User X2 are in Layer 1, Layer 2 and Layer 3 conversations together, wherein the layered conversation logic scales the volume of User X2 experienced by User X1 in conversation L1X1,X2 to S1,1% volume where S1 is a scaling factor.

Example 3

The virtual communication system of Example 2, wherein if the User X1 is in L2X1,X3 then the layered conversation logic adjusts the volume of the User X3 heard by the User X1 to S2,2% volume and scales the volume of User X2 experienced by User X1 in conversation L1X1,X2 to S2,1% volume, where S2,1 and S2,2 are scaling factors and S2,2>S2,1.

Example 4

The virtual communication system of Example 3, wherein if the user X1 is in L3X1,X4 then the layered conversation logic adjusts the volume of the User X4 heard by the User X1 to S3,3% volume, scales the volume of User X3 experienced by User X1 in conversation L2X1,X3 to S3,2% volume, and scales the volume of User X2 experienced by User X1 in conversation L1X1,X2 to S3,1% volume, where S3,3, S3,2 and S3,1 are scaling factors and S3,3>S3,2>S3,1.

Example 5

The virtual communication system of Examples 1-4, wherein any User in conversation L1X1, X2, X3, . . . XN may invite one or more Users of conversation L1X1, X2, X3, . . . XN to participate in conversation L2X1, X2, X3, . . . XN-1 contemporaneously with conversation L1X1, X2, X3, . . . XN.

Example 6

The virtual communication system of Examples 1-5, wherein any User in conversation L2X1, X2, X3, . . . XN may invite one or more Users of conversation L2X1, X2, X3, . . . XN to participate in conversation L3X1, X2, X3, . . . XN-1 contemporaneously with conversation L2X1, X2, X3, . . . XN and conversation L1X1, X2, X3, . . . XN.

Example 7

The virtual communication system of Examples 1-6, wherein any User in conversation L1X1, X2, X3, . . . XN may join conversation L2X1, X2, X3, . . . XN-1 contemporaneously with conversation L1X1, X2, X3, . . . XN.

Example 8

The virtual communication system of Examples 1-7, wherein any User in conversation L2X1, X2, X3, . . . XN may join conversation L3X1, X2, X3, . . . XN-1 contemporaneously with conversation L1X1, X2, X3, . . . XN.

Example 9

The virtual communication system of Examples 1-8, wherein the volume may be further scaled by a scaling factor $D_{X,Y}$ in proportion to a virtual separation between user X and User Y within the virtual communication system.

Example 10

The virtual communication system of Examples 1-9, wherein the volume may be further scaled by a scaling factor $E_{X,Y}$ in proportion to the facing orientation of user X relative to user Y within the virtual communication system.

Example 11

The virtual communication system of Examples 1-10, wherein the volume may be further scaled by a scaling factor $F_{X,Y}$ in proportion to the facing orientation of user Y relative to user X within the virtual communication system.

Example 12

The virtual communication system of Examples 1-11, wherein the volume may be further scaled by a scaling factor $G_{X,Y}$ in proportion to the volume scaling preferences of user X.

Example 13

The virtual communication system of Example 1, wherein the layered conversation logic controls the volume and a visual layout of each participant in each conversation in which the User participates in accordance with the conversation type.

Example 14

The virtual communication system of Example 2, wherein users belonging to a given Layer 2 conversation are objectively positioned in a virtual space at a predefined distance, orientation and layout in relation to each other.

Example 15

The virtual communication system of Example 14 further including visual indicators indicating users belonging to the given Layer 2 conversation.

Example 16

The virtual communication system of Example 2, wherein for every user in a Layer 2 conversation, the other users in the same Layer 2 conversations are subjectively positioned in a virtual space according to a predefined distance, orientation and layout in relation to each other and in relation to that user.

Example 17

The virtual communication system according to Example 16, wherein visual indicators indicate users belonging to the same Layer 2 conversation.

Example 18

The virtual communication system of Example 2, wherein users belonging to a given Layer 3 conversation are objectively positioned in a virtual space at a specified distance, orientation and layout in relation to each other.

Example 19

The virtual communication system of Example 18, wherein visual indicators indicate users belonging to the given Layer 3 conversation.

Example 20

The virtual communication system of Example 2, wherein every user in a Layer 3 conversation is subjectively positioned in a virtual space according to a predefined distance, orientation and layout in relation to other users in the Layer 3 conversation.

Example 21

The virtual communication system according to Example 20, wherein visual indicators indicate users belonging to the given Layer 3 conversation.

BRIEF DESCRIPTION OF THE DRAWINGS

FIG. 8 is a diagram depicting user C's field of view;

DETAILED DESCRIPTION

Figure 1:
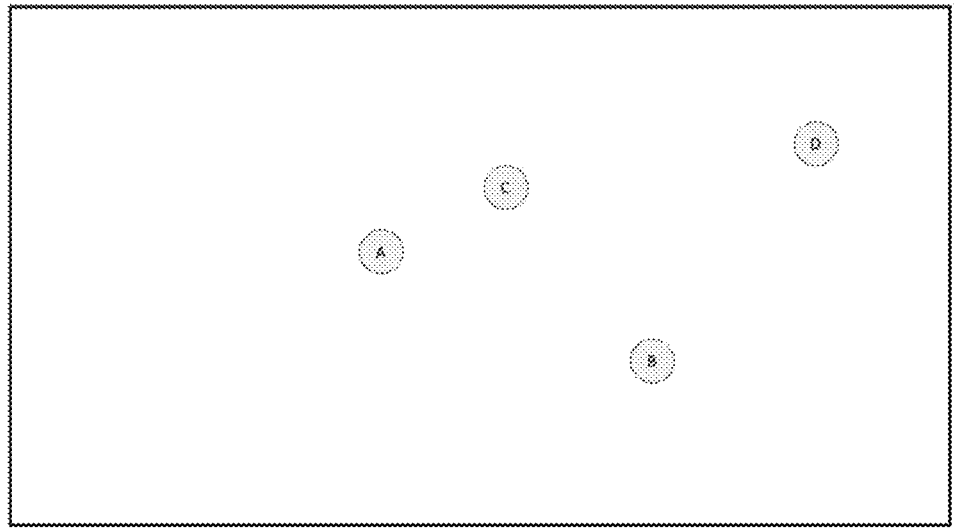
FIG. 1 is a diagram depicting users A-D.

A virtual conferencing system according to the present invention includes layers of conversations:

Layer 1 (entire session): the entire session including all of the users/participants at a virtual event or gathering.

Layer 2 (main conversations): a subset of the users/participants in layer 1 who have gathered into smaller group conversations.

Layer 3 (sidebar conversations): within each Layer 2 conversation, a subset of users/participants involved in sidebar conversations.

It should be understood that each participant in the conversation described herein accesses the Virtual Conferencing System ("System") using a computer, smartphone, gaming device, augmented or virtual reality device, or like device (hereinafter computer or User) which includes a processor or CPU or like hardware capable of executing software commands, a display, a data entry device such but not limited to a keyboard, memory, communications hardware facilitating telecommunications over a communications medium such as the internet, audio input (e.g., microphone) and audio output (e.g., speaker). The audio input and audio output may be combined into a headset, or any other method of communicating and/or translating audio inputs and outputs, including but not limited to translating audio inputs and outputs to other mediums, as is often done with adaptive tools. Each user may be visually represented to other users by a virtual representation of themselves such as avatars, video tiles (e.g., an image or placeholder graphic with the user's name, pseudonym, or initials), or the like.

As will be described below, the System may be implemented as a Peer-to-Peer communication system in which case each peer is a User. As will be described below, the System may be implemented as a Client-Server communication system in which case Client is a User and the Server is a computer which facilitates and coordinates communication among the Clients (Users). The Server need not include the audio input (e.g., microphone) and audio output, e.g., speaker.

The System of the invention includes logic for layering communications which may be implemented as software, hardware or a combination of both. For example, the logic may be implemented in code stored in a read-only-memory (ROM) device, an erasable programmable read-only-memory (EPROM or EEPROM) device or the like. The logic may be implemented in software code or instructions stored in memory residing within the computer, on a removable/portable media such as a memory stick, or on a server accessible over the internet.

The description that follows lays out a technical solution to enable layered conversations within a virtual communication, augmented reality, or gaming application which should be understood to be any application within which communications between users is facilitated (hereinafter videoconferencing or virtual conferencing application). In some examples, the layered conversation is not actually a conversation but rather consists of music or other sounds which may be associated with a location and orientation of a User within the virtual environment. However, one of ordinary skill in the art will appreciate that the technical solution may be used to enable layered conversations within a videogame application including three-dimensional gaming applications.

Layer 1: Entire Session

The first step in enabling layered conversations is to add a spatial dimension to a videoconferencing application. Instead of all the users being represented as video tiles in a grid pattern, they will instead have virtual representation of themselves (such as avatars, video tiles, or some other representation) placed into a virtual world where they can move around.

This world can either be two or more dimensions. For illustrative purposes, most of the diagrams in this document will be based on a two-dimensional world with a top-down (birds' eye view) perspective, but they can just as easily be applied to a three-dimensional environment.

The users can move within this world by any combination of one or more mechanisms (for example, the arrow keys on their keyboard), joystick, gestures, or the like.

Users can move their avatars or video tile moves within the world, and they can see other users' avatars or video tiles move as well corresponding to those users' movements.

Users can speak to other users, hear other users when they speak, and see each other through the video tiles, preserving both the voice and video components of a videoconferencing application.

For each user, the volume of other users' audio may automatically adjust based on relative distance. For example, in FIG. 1 each user is represented by a gray circle, such that User A is the gray circle with the letter 'A' inside of it. User A can hear User C at a relatively higher volume, User B at a relatively moderate volume, and User D at a relatively low volume.

Converting distance to a volume adjustment could be done using the following equation:

$$V = \frac{1}{d^p}$$

Where V is the volume, d is the distance, and p is the power exponent.

One way to technically implement this function would be to pick a base distance which represents full volume. For example, we could pick a distance of 10 units for full volume. In that case, the value of d would be calculated as the lesser of 1 and $$\frac{\text{user's distance}}{10}.$$

in other words, it a user is 10 units away, d would equal 1. If the user is 25 units away, d would equal 2.5, and so on. If we also choose a value of, say, 2 for p, then the volume of that user (at 25 units away) as a percentage of their maximum volume would be $$V = \frac{1}{2.5^2} = \frac{1}{6.25} = 0.16 \text{ or } 16\%.$$

Figure 2:
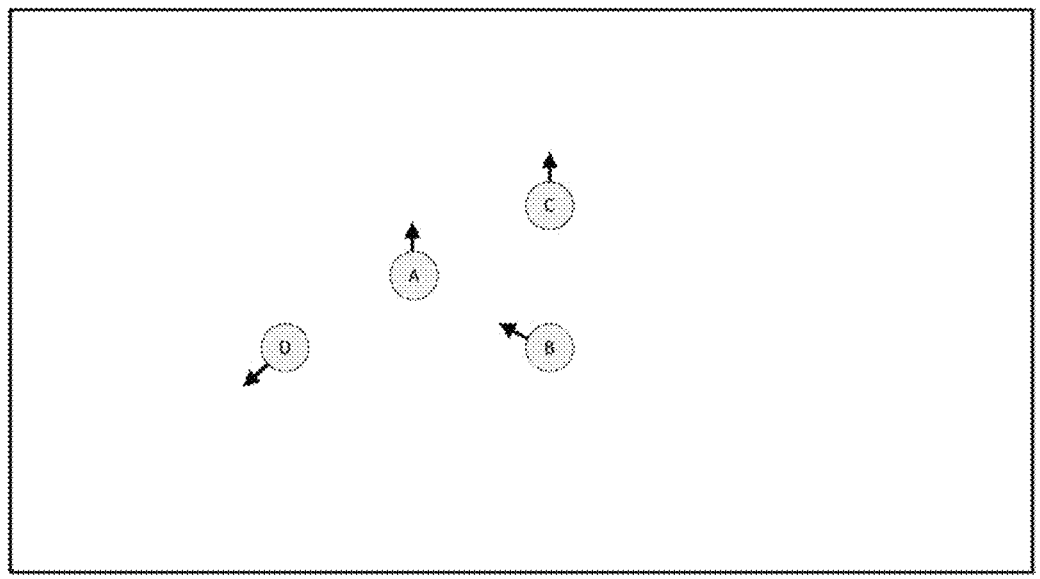
FIG. 2 is a diagram depicting Users A-D with an arrow denoting a direction each user is facing.

For each user, their volume may also be adjusted based on the orientation of that user to other users or interactive element(s). Here by 'orientation' we mean where any user is directing their attention or focus toward or away from anyone or anything, which may be accomplished by any combination of one or more aspects of controls that might indicate orientation such as the direction a user is facing, moving, turning, looking, gesturing, etc. For example, in FIG. 2 each user's orientation is represented by the arrow attached to that user. By manner of example, let's assume that users B, C and D are at equal distance to User A, but they are facing in different directions as denoted by the arrows. As a result, User A would hear User B the loudest, User C at a lower volume than B, but higher than D, and User D at the lowest relative volume.

The volume calculations for both distance and orientation can be performed and applied independently, or in combination. One possible implementation would be to cross-multiply the distance and orientation values to create a combined volume adjustment. For example, if User A would hear User B at 80% of full volume based on their relative distance, and at 70% based on User B's orientation, then the combined effect would be that User A would hear User B at 80% times 70%, or 56% of full volume.

Layer 2: Main Conversations or 'Convos'

Layer 1 allows users to move between conversations, which encourages more active participation, but will be a sub-optimal experience for several reasons:

a) Volume controls that rely exclusively on distance and orientation may result in an unpleasant combination of sounds that may distracting or disruptive if sounds are indistinguishable from the conversations they are engaged in, such as those from other nearby users with whom users are not having a conversation.

b) Arranging users into a conversational circle requires too much effort and coordination from all the users in a conversation as users enter and exit the conversation.

c) In a three-dimensional virtual world, limitations resulting from screen size and field-of-view may make it difficult to have everyone face each other and see each other, and even if they do, their avatars or video tiles will be severely tilted with respect to each other.

To solve these and other issues, we will introduce a technical object called 'Convo' and refer to it as such going forward. Users will be able to create a Convo, join an existing Convo, or exit a Convo if they are inside of one.

Figure 3:
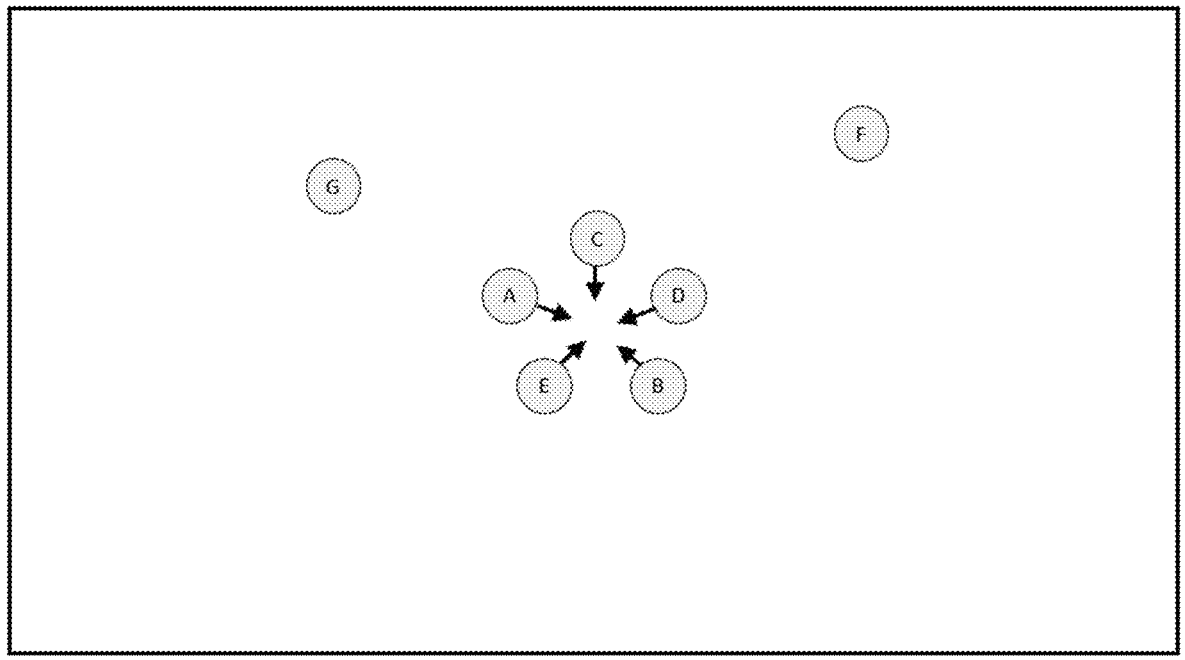
FIG. 3 is a diagram depicting users A, B, C, D, and E in a Convo with each other, while users G and F are not in a Convo.

In FIG. 3, users A, B, C, D, and E are in a Convo with each other, while users G and F are not in a Convo.

Figure 4:
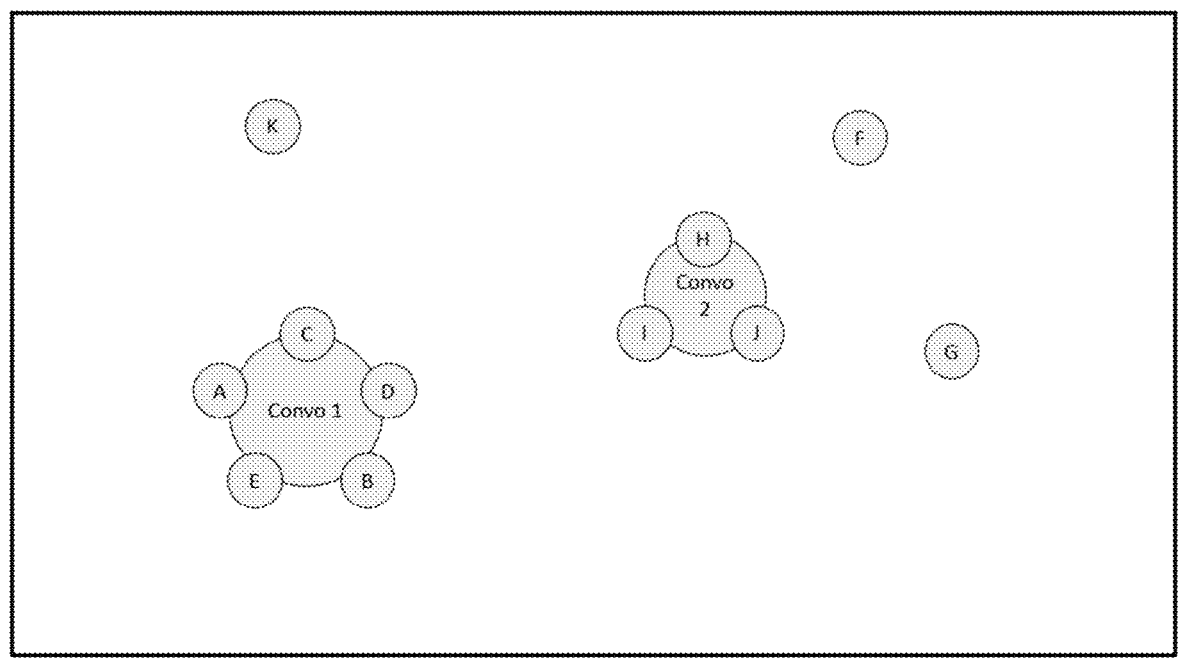
FIG. 4 is a diagram depicting users A, B, C, D, E in Convo 1, users H, I, J in Convo 2 and users F and K not in any Convo.

When users are in a Convo, the following occurs:

a) Within the virtual world, all users are arranged in a circle, such that the distance between each user and their nearest two users is equidistant.

b) Within the virtual world, all users are oriented to face the center of the circle.

c) According to one example, Users' volumes are adjusted such that for each user in a Convo, they can hear all other users inside that same Convo at full volume, and users outside of the Convo at a reduced volume. For example, in the diagram above, User A could hear users B, C, D, and E at full volume, and users G and F at reduced volume. The volume reduction applied to the volumes of User G and User F may be combined (for example, in a multiplicative manner) with volume reduction factors due to the distance and orientation of those users relative to User A.

d) An optional movement limitation may be imposed, such as not allowing users inside the Convo to move around freely within the world until they exit the Convo.

e) If the virtual world has three spatial dimensions, each user may see a subjective view of other users' video tiles which arranges them into a pattern, such as in the shape of a semi-circle, with respect to that user and faces their video tiles more in the direction of that user. See section titled 'Subjective Convo View' for further description. Multiple Convos can exist in a single Layer 1 session. In FIG. 4, Users A, B, C, D, and E are in one Convo (labeled Convo 1). Users H, I and J are in another Convo (labeled Convo 2). Users F, G and K are not in a Convo.

In FIG. 4, all users in Convo 1 may hear each other at full volume, and may hear all other users (H, I, J, K, F, and G) at reduced volume, based on a Convo volume reduction factor as well as additional volume reduction factors due to distance and orientation. Similarly, all users in Convo 2 may hear each other at full volume, and may hear all other users at reduced volume due to all three reduction factors (Convo, distance, orientation). Finally, users K, F and G may hear all other users at a reduced volume due to distance and orientation, but not due to a Convo reduction factor since they are not in a Convo. Alternatively or additionally, other factors can be introduced such that users who are not in a Convo hear users who are in a Convo at enhanced or reduced volume.

The volume rules described above apply as long as:

a) There are no Layer 3 (sidebar conversations) occurring, in which case additional volume adjustments may be applied as outlined further in this document.

b) A convo is set to 'public'. If a Convo is set to 'private', no users outside of the Convo may hear any of the users inside the Convo.

Layer 3: Sidebar Conversations

Layers 1 and 2 combined enable users to move around a virtual world, interact with each other, and freely organize into smaller conversations within one session, so that multiple conversations can take place at the same time.

Next, we can enable another layer on top of that, which will allow users to have side conversations within Convos. We will term these side conversations 'Sidebars' and refer to them as such going forward.

Figure 5:
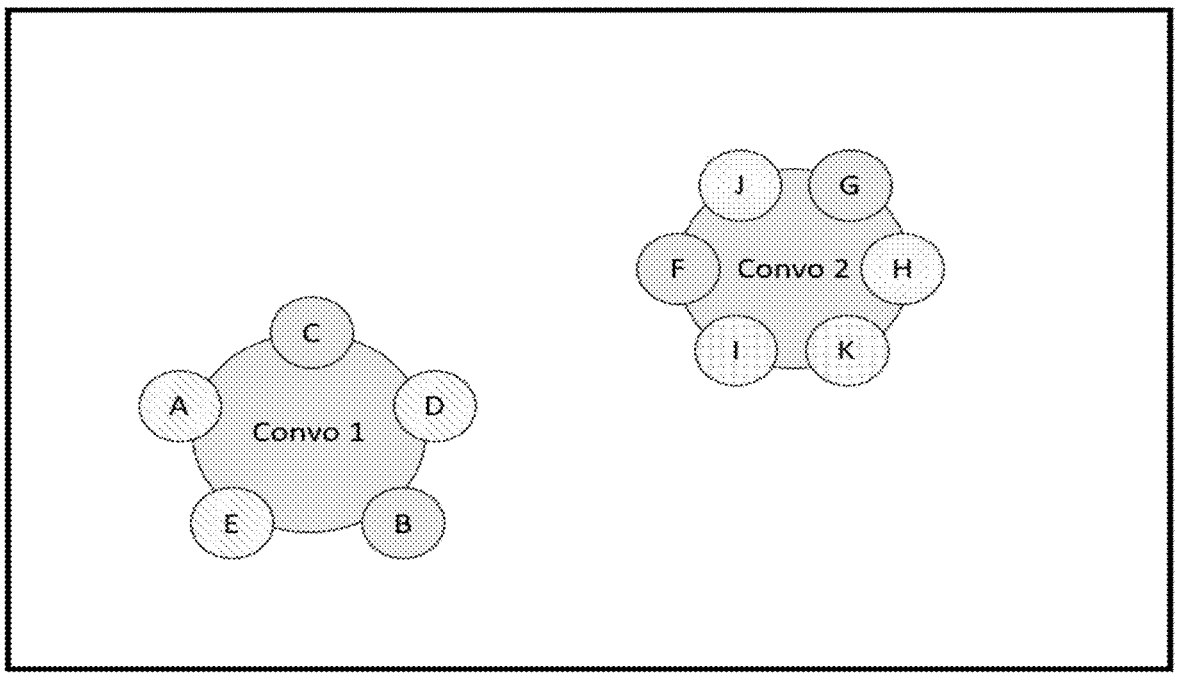
FIG. 5 is a diagram depicting users A, B, C, D, E in Convo 1, users F, G, H, I, J, K in Convo 2.

In FIG. 5, matching patterns on the user circles denote that they are in a Sidebar with each other, while users with solid gray shading (no pattern) are in the Convo but not in a Sidebar. In Convo 1, users A, D and E are in a Sidebar. In Convo 2, there are two Sidebars happening: one between users J and H, and another between users I and K.

Sidebars have the following properties:

a) A Sidebar can take place inside of a Convo between users who are part of the same Convo.

b) A Sidebar can consist of two or more users.

c) Users can initiate Sidebars with each other, join an existing Sidebar, or exit a Sidebar if they are inside of one.

d) One example that can be included in the System is that if the number of users inside of a Sidebar reaches N-x, where N is the number of users in a Convo and x is either predetermined or pre-specified number (majority or super-majority), then the Sidebar has grown to overtake the Convo and may dissipate such that all users are returned to the Convo. In other words, the Sidebar may automatically cease to be a Sidebar if the number of participants exceeds a threshold value. In that case, the "Sidebar" is the main conversation and the Sidebar dissipates in favor of the Convo.

Users' volumes may be adjusted such that:

a) Users in a Sidebar hear other users inside the same Sidebar at full volume, and the rest of the users in the same Convo at a reduced volume based on a Sidebar volume reduction factor that for each user, every other user's volume is adjusted based on: (1) Spatial distance to that user, Orientation relative to that user; (2) Whether that user is in a Convo and whether the other users are in a Convo; or (3) Whether that user is in a Sidebar and whether the other users are in a Sidebar.

Figure 6:
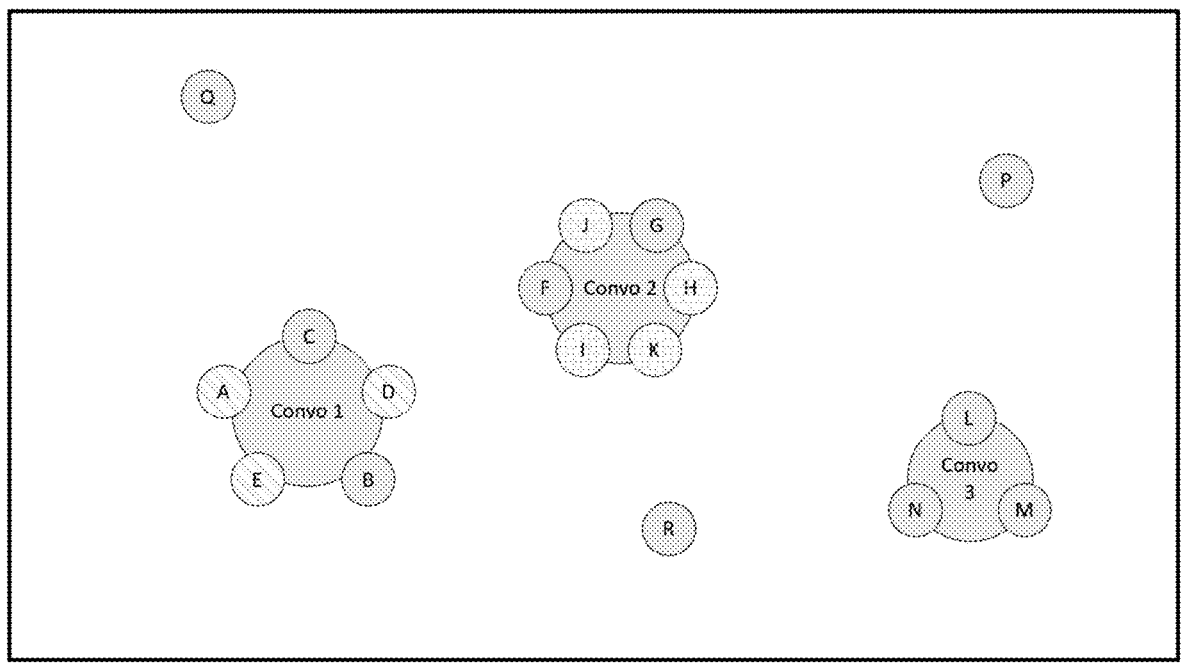
FIG. 6 is a diagram showing user A, B, C, D, E in Convo 1, users F, G, H, I, J, K in Convo 2, users L, M, N in Convo 3 and user P & Q not in any conversation.

Referring to FIG. 6, user A may hear the other users shown in Table 1:

TABLE 1

| Users | Factors impacting volume | Resulting volume |
| --- | --- | --- |
| Users D and E | In same Sidebar as user A | Full volume |
| Users B and C | In same Convo as user A but not in same Sidebar | Single reduction effect from: Reduced volume (outside of user A's Sidebar) |
| Users P, Q, and R | Not in same Convo as user A, and at a distance from user A | Combined reduction effect from: Reduced volume (outside of user A's Sidebar) Reduced volume (outside of user A's Convo) Reduced volume (distance and orientation) |
| Users F, G, L, M, and N | In a different Convo from user A, and at a distance from user A | Combined reduction effect from: Reduced volume (outside of user A's Sidebar) Reduced volume (outside of user A's Convo) Reduced volume (distance and orientation) Reduced volume (in different Convo) |
| Users J, H, I, K | In a different Convo from user A, in a different Sidebar within that Convo, and at a distance from user A | Combined reduction effect from: Reduced volume (outside of user A's Sidebar) Reduced volume (outside of user A's Convo) Reduced volume (distance and orientation) Reduced volume (in different Convo) Reduced volume (in different Sidebar) | b) Users in a Convo containing a Sidebar but who are not part of that Sidebar will hear other users who are also in the same Convo but not in a Sidebar at full volume, and will hear users inside of a Sidebar at reduced volume.

In the FIG. 5, within Convo 1:

a) Users A, D and E would hear each other at full volume, and would hear users C and B at reduced volume.

b) Users C and B will hear other at full volume, and will hear users A, D and E at reduced volume.

In FIG. 5, within Convo 2:

a) Users J and H will hear each other at full volume, and will hear users G, F, I, and K at reduced volume.

b) Users K and I will hear each other at full volume, and will hear users F, G, H, and J at reduced volume.

c) Users G and F will hear each other at full volume and will hear users H, I, J, and K at reduced volume. An indicator of some kind may be employed to let users know who they are in a Sidebar with. A different indicator will be used to let users know if other users are in a Sidebar with each other. As an example, visual indicators such as matching borders/ frames/rings can be placed around users' video tiles to indicate that they are in the same Sidebar. They can be matching based on any combination of colors, shapes, sizes or patterns to indicate which users are in the same Sidebar and which ones are in a different Sidebar or not in a Sidebar at all.

To summarize, multiple Convos (Layer 2) can exist inside a Layer 1 session, and multiple Sidebars (Layer 3) can exist within the Convos. In FIG. 6, we illustrate 17 users in a session as follows: Convo 1 contains 5 users, with 3 users in a Sidebar within that Convo. Convo 2 contains 6 users, with 2 Sidebars within that Convo, each containing 2 users. Convo 3 contains 3 users with no Sidebars. Three (3) additional users (P, Q, and R) are not in a Convo.

All volume adjustment rules outlined so far may be combined (for example, in a multiplicative manner), such Starting, Joining and Exiting Layer 2 and Layer 3 Conversations For Convos: A user can start a new Convo with another user as long as neither of them is currently in a Convo. Some examples by which a Convo can be started are:

A user spatially approaches another user and stops moving, which commences a countdown. As long as neither user moves for a set time interval (for example, 3 seconds), they are automatically entered into a Convo. In addition to the time interval, additional criteria may be added, such as how far apart the two users are the angle at which they are facing each other.

A user clicks on another user to enter a Convo, or clicks on an interface (e.g., a symbol above the other user's video tile) to start a Convo with them.

A user locates another user in a directory table accessible through a UI interface and from there selects an option to start a Convo with that user.

A designated user with the right permissions creates a new Convo consisting of certain users they select.

An algorithm is used to create a Convo consisting of certain users, either based on random placement or some type selection rule (for example, matching based on shared interests).

An amount of time passes during which no users inside that Convo speak.

Once a Convo has been created, other users can join the same Convo as long as they are not already in a Convo. Some examples by which a user could join a Convo are:

1) a user spatially approaches an existing Convo and stops moving, which commences a countdown. As long as the user does not move for a predetermined time interval (for example, 3 seconds), they join the Convo.

2) A user spatially approaches an existing Convo and moves far enough into it or through it in order to enter the Convo. While the user is entering the Convo, there may be visual indicators provided to let the user know they are entering a Convo, and certain modifications may be made to the user's movement speed or orientation.

3) A user clicks on an existing Convo, or clicks on an interface (for example, a symbol above the Convo or in front of the Convo) to join the Convo.

4) A user locates another user in a directory table accessible through a UI interface and from there selects an option to join a Convo with that user.

5) A user locates the Convo in a directory table accessible through a UI interface and from there selects an option to join that Convo.

6) A user with the right permissions selects specific users to add to the Convo

An algorithm is used to add users to an existing Convo, either based on random placement or some type of selection rule (for example, matching based on shared interests). Users inside an existing Convo may place (bring) a user currently outside of that Convo inside their Convo.

Once inside a Convo, users can exit a Convo at any time to return to exploring the virtual world. Some examples by which a user could exit a Convo are:
- A user uses a movement key (for example, the down arrow on the keyboard) to walk out of the Convo.
- A user uses a movement key (for example, the down arrow on the keyboard) to walk out of the Convo, but needs to hold that movement key down for a set time interval (for example, 1 second).
- A user clicks on an interface (for example, a button labeled 'Exit Conversation')
- A user uses a keyboard key or shortcut to exit the Convo.
- An algorithm or mechanism is used to 'mix up' users who are currently in a Convo by placing them in a different Convo, either based on random placement or some type of selection algorithm (for example, matching based on shared interests).
- A user is removed or kicked out of a Convo by a user (participant) in that Convo, subject to certain permissions or consensus.
- Any action or mechanism which can be used for a user to enter a different Convo could automatically remove the user from their previous Convo.
- If a user exits a Convo which contained only one other user, the other user may automatically exit that Convo and the Convo may be terminated.

For Sidebars

A user can start a new Sidebar with another user as long as both of them are in the same Convo and the other user is not currently in a Sidebar. Some examples by which a Sidebar could be started are:
- A user clicks on another user's video tile.
- A user clicks on an interface which in some examples is a hyperlink on or proximate another user's video tile.
- A user locates another user in a directory table accessible through a UI interface and from there selects an option to start a Sidebar with that user.

A user can join an existing Sidebar as long as that Sidebar is within the same Convo as that user. Some examples by which a Sidebar could be joined are:
- A user clicks on the video tile of another user who is currently in that Sidebar.
- A user clicks on an interface which in some examples may be above or on top of the video tile of another user who is currently in that Sidebar.
- A user locates another user in a directory table accessible through a UI interface and from there selects an option to join a Sidebar with that user.
- A user locates the Sidebar in a directory table accessible through a UI interface and from there selects an option to join that Sidebar.

A user can exit a Sidebar if they are inside of a Sidebar. Some examples by which a Sidebar could be exited are:
- Any action that the user takes to exit the Convo (see mechanics on exiting a Convo earlier in this document) may exit that user from any Sidebars they were a part of inside that Convo.
- A user clicks on an interface (for example, a button labeled 'Exit Sidebar').
- A user uses a keyboard key or shortcut to exit a Sidebar.
- A user is removed or kicked out of a Sidebar by one or more users, subject to certain permissions or consensus.
- An amount of time passes (elapses) during which no users inside that Sidebar speak.
- Any action or mechanism which can be used for a user to enter a different Sidebar could automatically remove the user from their previous Sidebar.
- If a user exits a Sidebar but does not exit the Convo, the user may remain in the Convo which contained that Sidebar.
- If a user exits a Sidebar which contained only one other user, the other user may automatically also be exited from that Sidebar and the Sidebar may be terminated.

Subjective Convo View

As outlined earlier, in a virtual world with three spatial dimensions, users in a Convo may have a subjective view of the other users in the same Convo. One potential benefit of this would be to give each user a 'best-seat-in-the-house' experience.

Figure 7:
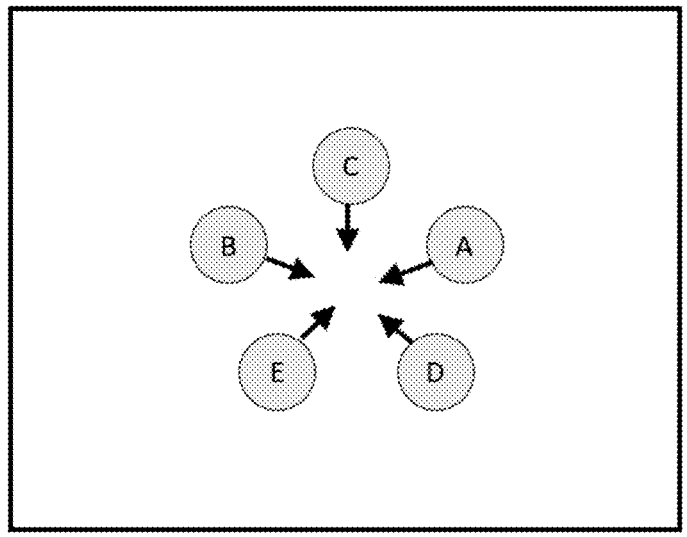
FIG. 7 is a diagram depicting users A, B, C, D & E in a 5-person Convo, facing the center as shown by the arrows.

In FIG. 7, users A, B, C, D & E are in a 5-person Convo, facing the center as shown by the arrows. This is a top-down (bird's eye view) of the Convo.

Figure 8:
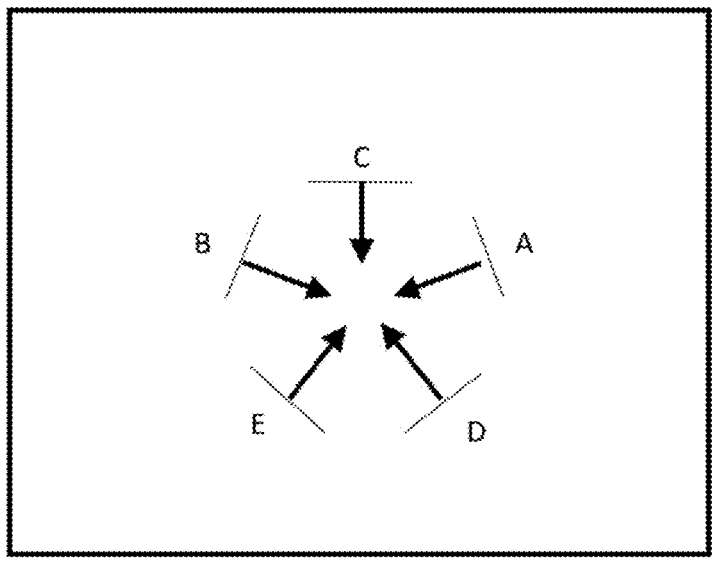
FIG. 8 is a diagram depicting users A, B, C, D & E in a 5-person Convo, facing the center as shown by the arrows.

FIG. 8 illustrates the problem that arises without a subjective view; we take the same diagram shown in FIG. 7 but instead of circles representing each of the users, we use lines to indicate which way their video tiles may be oriented as they are facing in the direction of the arrows.

Figure 9:
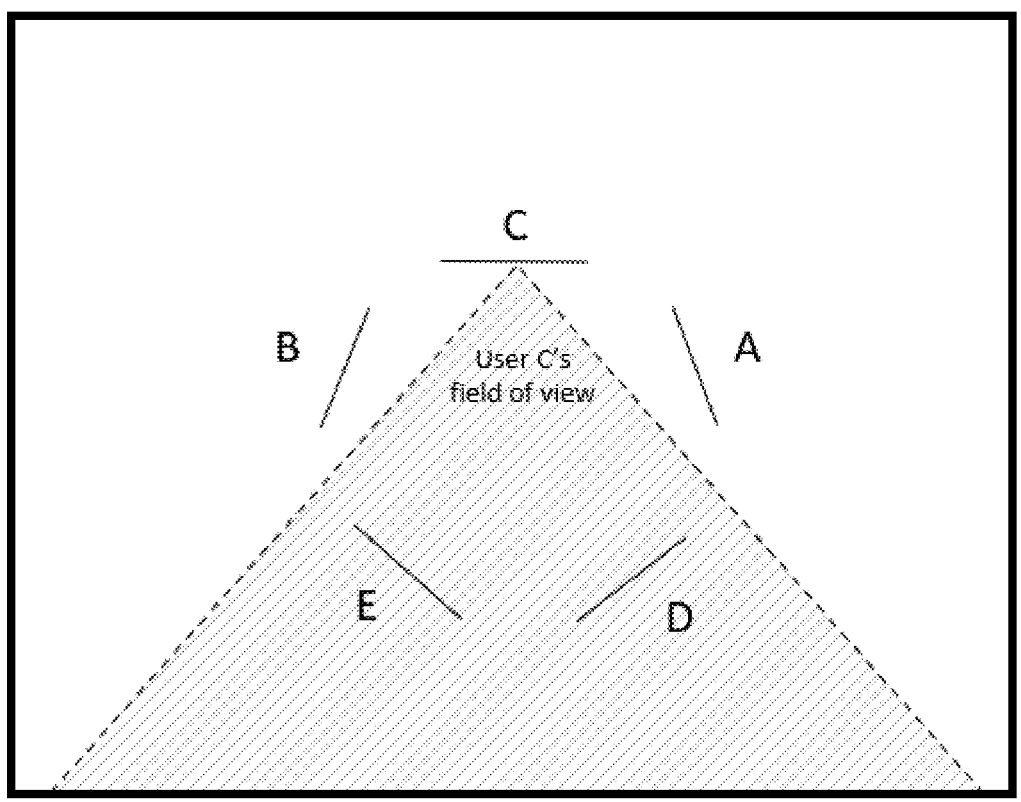
FIG. 9 is a diagram illustrating User C's field of view from a first-person perspective, represented by the cone shape filled with the diagonal-line pattern and dashed lines on the outside of it.

In FIG. 9, we represent User C's field of view from a first-person perspective, represented by the cone shape filled with the diagonal-line pattern and dashed lines on the outside of it.

In this case, User C may not be able to see user users A or B, only D and E.

Figure 10:
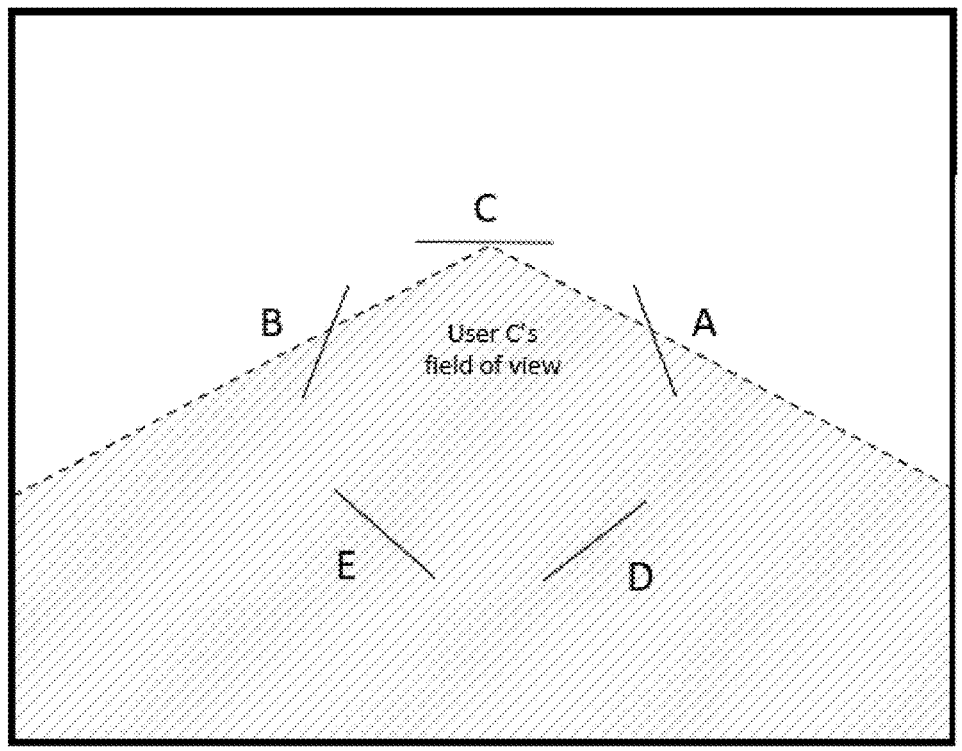
FIG. 10 is a diagram illustrating what a wider field of view for User C might look like from a top-down view.

It's worth noting that we can adjust field-of-view values to make it narrow or wider, albeit with certain compromises when we go too wide. However, even if accept those compromises and select a really wide field of view, it will be difficult to include the entirety of User A and B's video tiles, and they may be severely tilted away from User C. FIG. 10 illustrates what a wider field of view for User C might look like from a top-down view.

Figure 11:
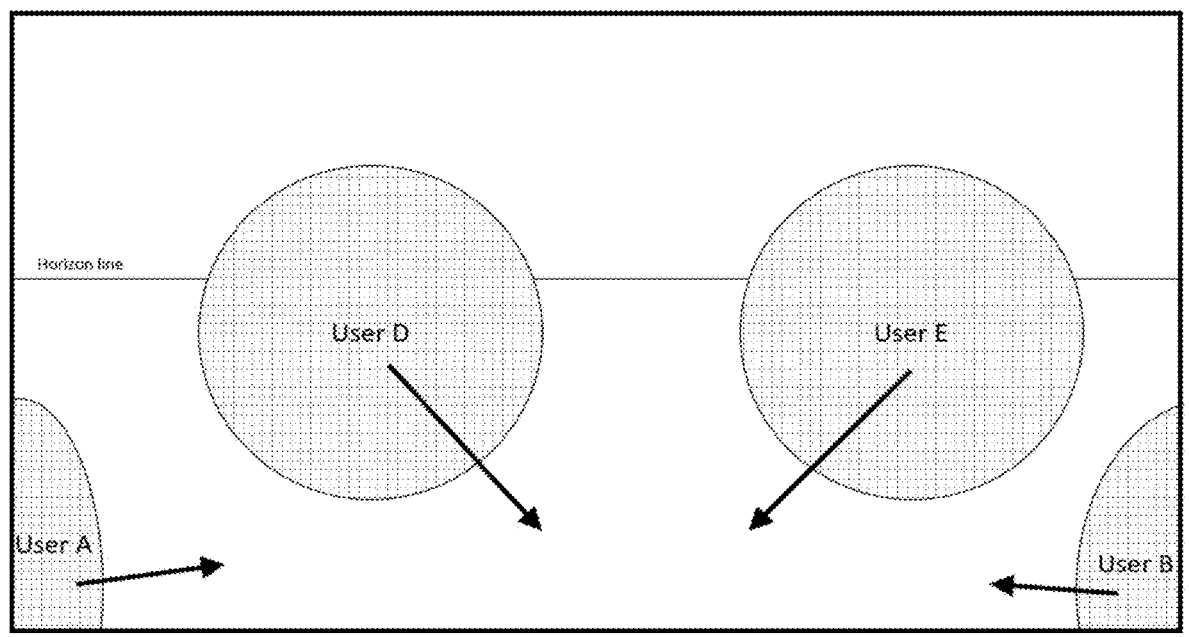
FIG. 11 is a diagram illustrating what it might look like in a three-dimensional space from User C's first-person point of view.

FIG. 11 illustrates what it might look like in a three-dimensional space from User C's first-person point of view. The pattern with squares represents the area where the video tiles would be displayed, and arrows denote the direction that the video tiles would be tilted.

Users D and E may be visible (from C's perspective), with their videos somewhat tilted, and users A and B may be mostly outside of the field-of-view and their videos may be significantly tilted.

Figure 12:
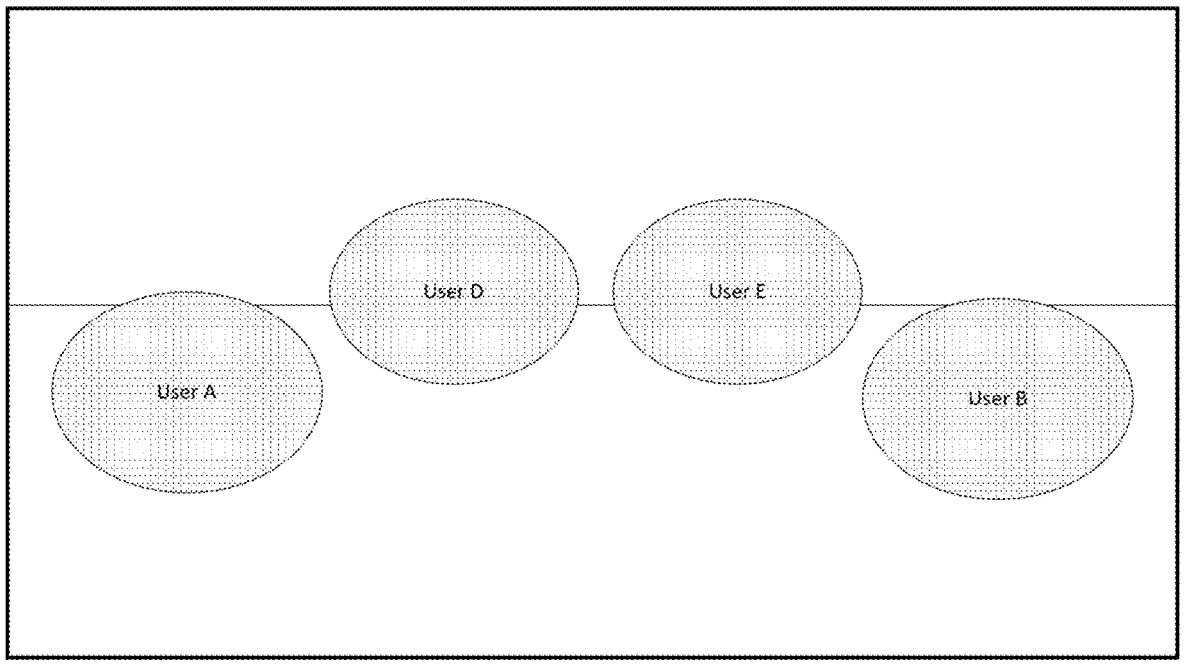
FIG. 12 is a diagram of a subjective view in which, from User C's first-person point of view, they are able to see all the other users in their field of view, and their videos are tilted facing toward User C (either perfectly facing or only slightly tilted)

To solve this problem and improve the user experience, we introduce a subjective view in which, from User C's first-person point of view, they are able to see all the other users in their field of view, and their videos are tilted facing toward User C (either perfectly facing or only slightly tilted). See, FIG. 12.

Figure 13:
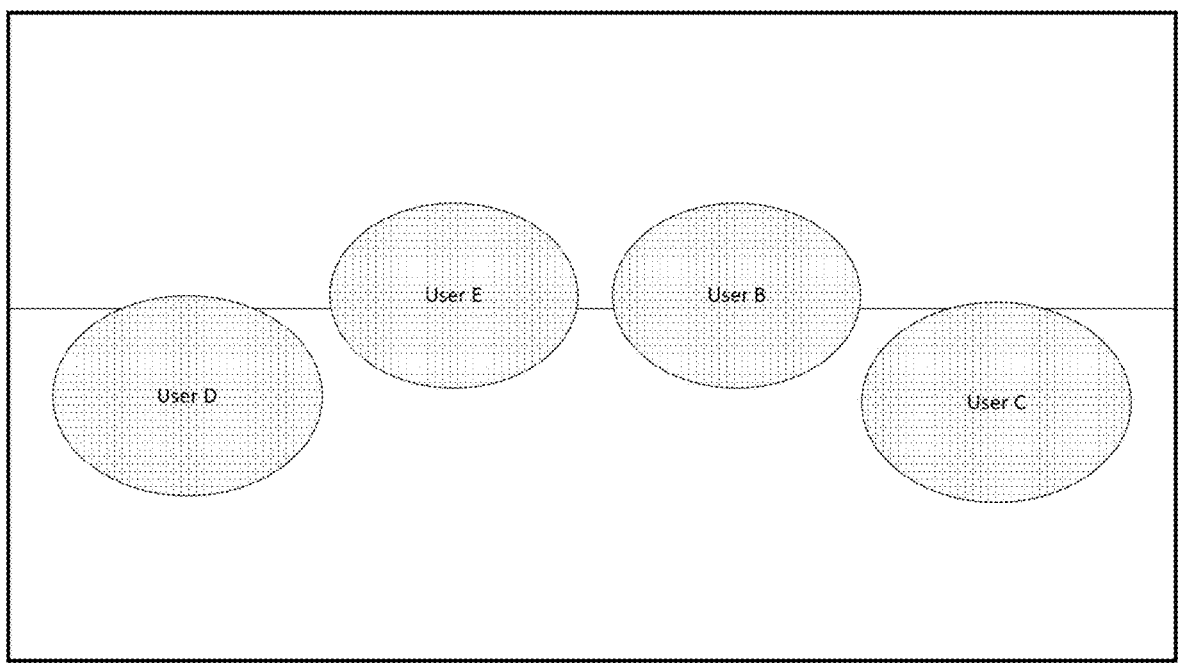
FIG. 13 depicts an example of User A's subjective view, allowing User A to see Users D, E, B, and C's video tiles all appearing as if they are facing User A.

Similarly, every other user in the Convo may have their own subjective view which allows them to similarly see the other four users. For example, FIG. 13 illustrates an example of User A's subjective view, allowing User A to see Users D, E, B, and C's video tiles all appearing as if they are facing User A.

Figure 14:
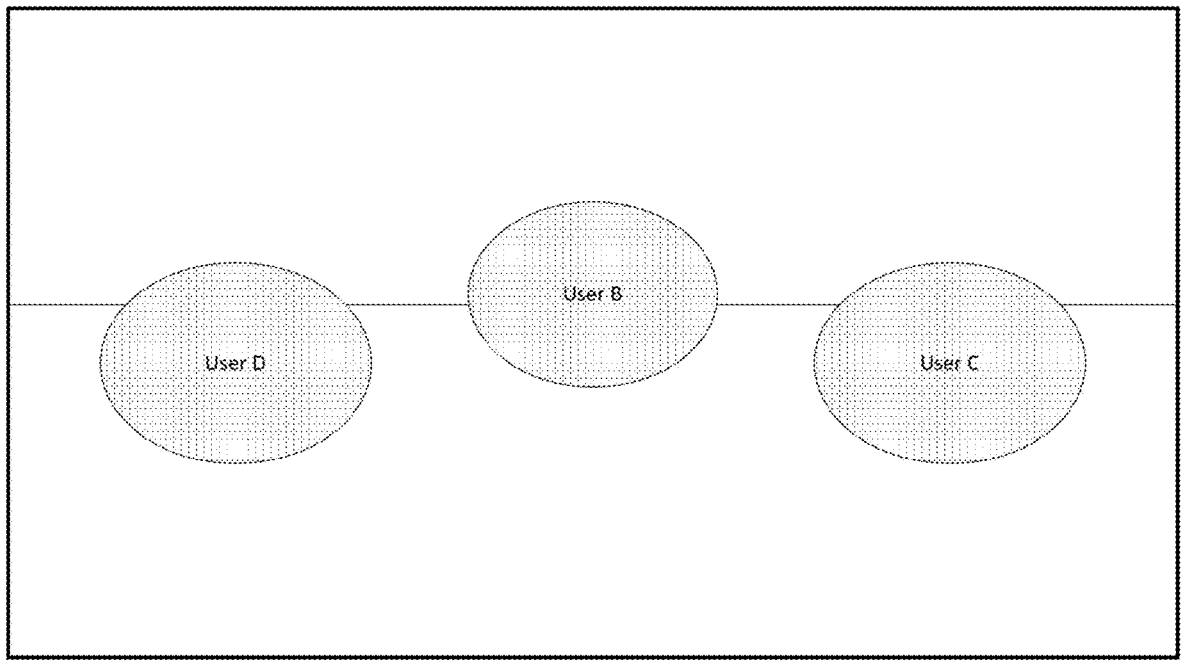
FIG. 14 illustrates the example of FIG. 13 after User E leaves.

This subjective view may automatically adapt to accommodate more or fewer users. For example, if User E leaves, the view may adjust to a 4-person Convo subjective view. See, FIG. 14.

Figure 15:
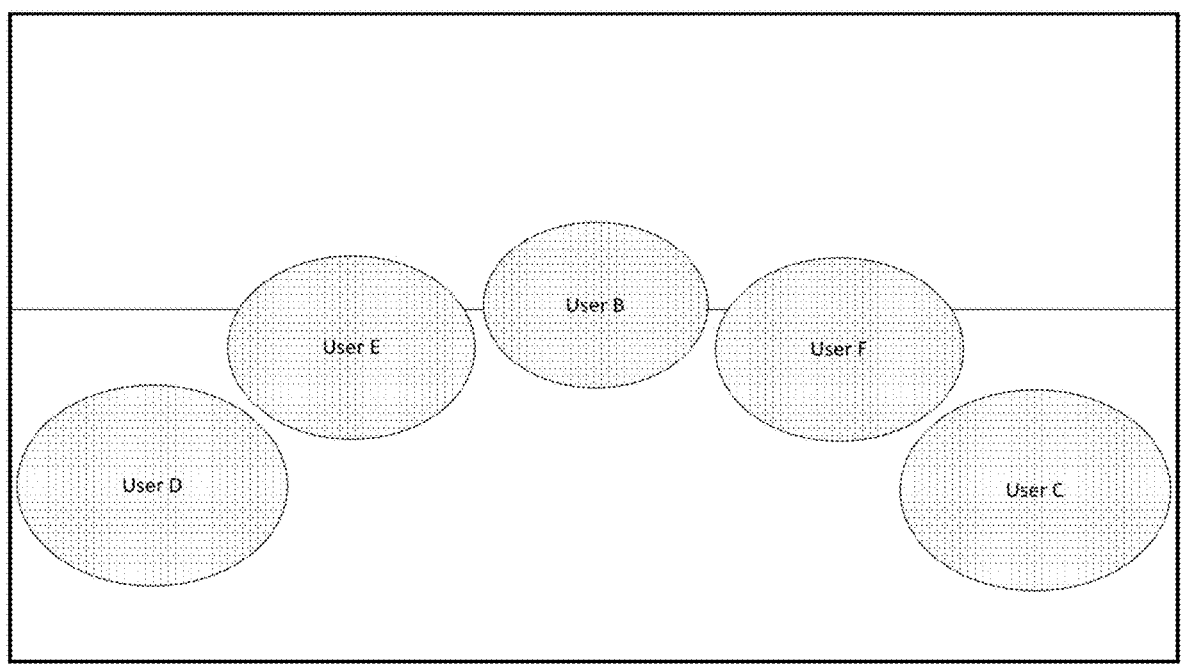
FIG. 15 illustrates the example of FIG. 13 after User F joins.

Similarly, if instead of User E leaving, let's say User F joined the previous 5-person convo to make it a 6-person convo. The subjective view may again adjust. See, FIG. 15.

The diagrams shown in FIGS. 12-15 are purely illustrative, and different variations can be taken in the shape and size of the video tiles, and the layout in which they are arranged. For example, instead of oval-shaped video tiles being arranged in a semi-circle, we might have square-shaped tiles arranged in a triangle layout. Regardless of which shape and layout is chosen, each user may have a subjective view of the other users' video tiles to enable them to see all the users in the same convo, and to have them all tilted in the direction of that user.

The subjective view may or may not be applied to a Convo with only a few participants (for example, a 2-person or 3-person Convo), as a few users may simply be able to face each other without the problems outlined earlier. For these smaller Convos, the other Convo rules (such as volume adjustments) may still be applied while allowing the few users to move around and turn freely, as long as certain factors such as their distance and orientation remain within a certain range.

Technical Implementation for Convos and Sidebars

A certain level of coordination and communication between users may help to ensure that Convos and Sidebars function as previously described, such that each user knows:

1) Which, if any, Convo or Sidebar that user belongs to; and

2) Which, if any, Convo or Sidebar other users belong to.

This information may be contained in Convo and Sidebar objects, where each object contains a unique ID for that Convo or Sidebar and a list of users which are part of that Convo or Sidebar.

The collection of this and other information, in some storage medium (e.g., memory, storage or a database) will be referred to as the 'knowledge base'. Each user (and server, if a server is part of the architecture) may keep and maintain its own knowledge base.

Users must also be able to communicate and coordinate in order to i) Request changes to Convos or Sidebars (such as leaving or exiting); (ii) Confirm/accept changes, as applicable, to Convos or Sidebars (such as confirming that they are in a Sidebar with another user); and (iii) Update for changes (such as other users leaving or exiting Convos or Sidebars).

Communication between users and/or server can happen via any number of web-based communication protocols (such as TCP, IP, HTTP, or the like), or any communication channels built on those protocols (such as web sockets, BOSH, REST, or the like).

This communication and coordination may happen through a peer-to-peer architecture (each user communicates directly with every other user), through a client-server architecture (where each user is a client and the clients communicate and coordinate through a server, which then communicates and coordinates with the other users/clients), or through combination of the two (for example, some communication or coordination might happen through peer-to-peer implementation while a different communication or coordination might happen through a client-server implementation).

Figure 16:
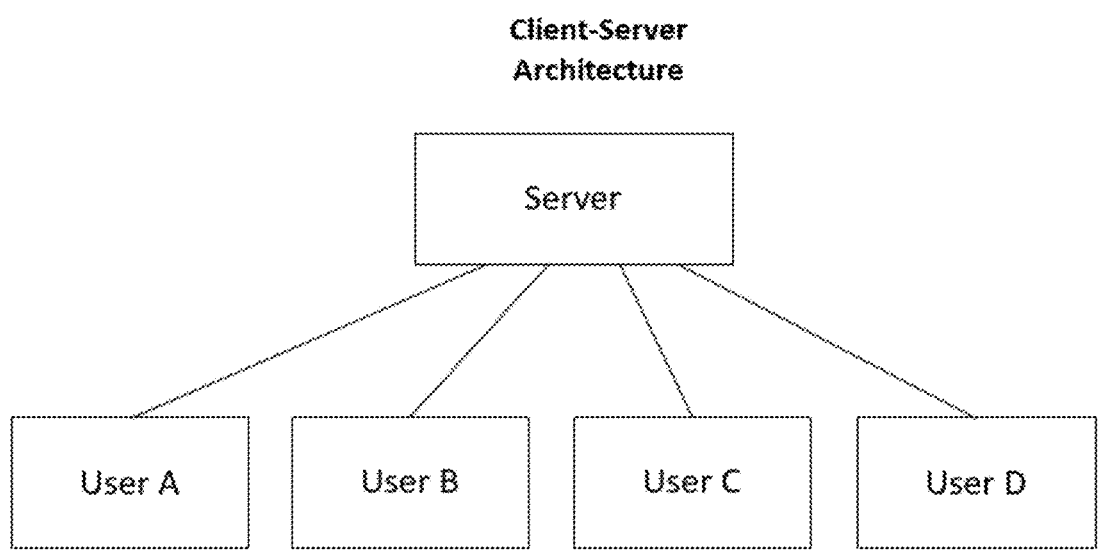
FIG. 16 is a block diagram of a client-server implementation.

FIG. 16 is an illustrative diagram of a client-server architecture in which Users A, B, C, and D communicate and/or coordinate with each other through a Server. The blocks represent the nodes (Server and clients) and the lines represent the connections for communication. For example, if User A wanted to communicate something to User C, that message may be sent from User A to the Server and then from the Server to User C. If any calculations are required, they may be performed by individual users or they may be performed by the Server and then the results may be communicated to the users.

Figure 17:
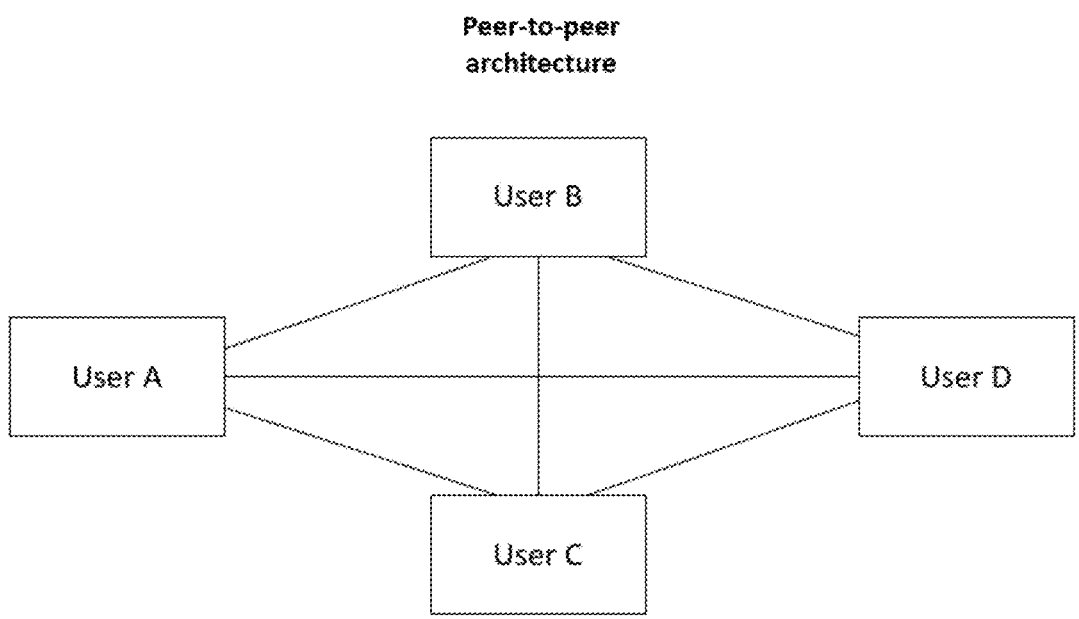
FIG. 17 is a block diagram of a peer-to-peer implementation.

FIG. 17 is an illustrative diagram of a peer-to-peer architecture in which users A, B, C, and D communicate and/or coordinate directly with each other. In this architecture, if User A wanted to communicate something to User C, that message may be sent directly from User A to User C. If any calculations are required, they may either be performed by User A and the results may be communicated directly to user C, or they may be performed by user C after the needed input data is received from user A.

Regardless of which architecture, or combination of architectures, is selected, any time any user updates their knowledge base regarding which users are in which Convos or Sidebars, they may also take accompanying actions such as updating their view of those users in the virtual world, updating their Convo view, updating Sidebar visual indicators, adjusting volume accordingly, and so on.

Figure 18:
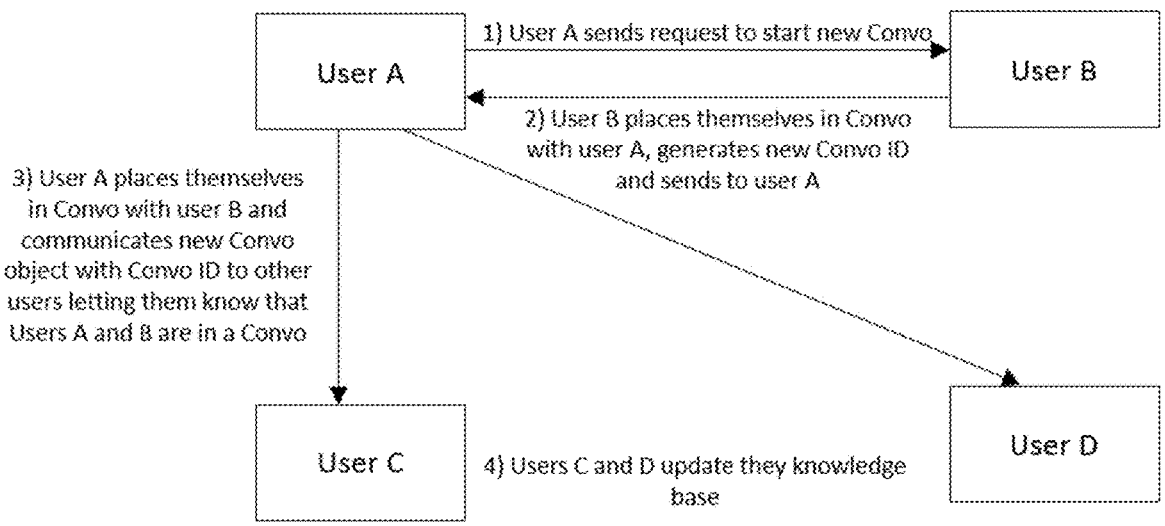
FIG. 18 is a block diagram of starting a convo in a peer-to-peer implementation.

Technical Implementation:

For User A to start a new Convo with User B, a 'Start Convo' mechanism may be triggered by any number of potential events as outlined earlier in this document. Once this trigger occurs, the implementations for peer-to-peer and client-server might be as follows:

A) Peer-to-peer implementation: User A would send a request to User B to start a new Convo with User A. Upon receiving the request, User B would verify that they are not in another Convo and then create a new Convo object (represented by a unique ID) and would send that ID back to User A confirming the start of a new Convo between A and B. User B would then place themselves in a Convo with User A. Upon receiving the confirmation and the ID from User B, User A would also place themselves in a Convo with User B. Both users are now in a new Convo with the other user and they both have the same Convo ID for that Convo object. Along with the completion of this process, either User A or User B would send out a communication to all other users in the same session letting them know that there is a new Convo object, providing the ID for that object, and that it contains users A and B. All other users would update their knowledge base with the new information. One way this may be implemented is shown in FIG. 18.

Figure 19:
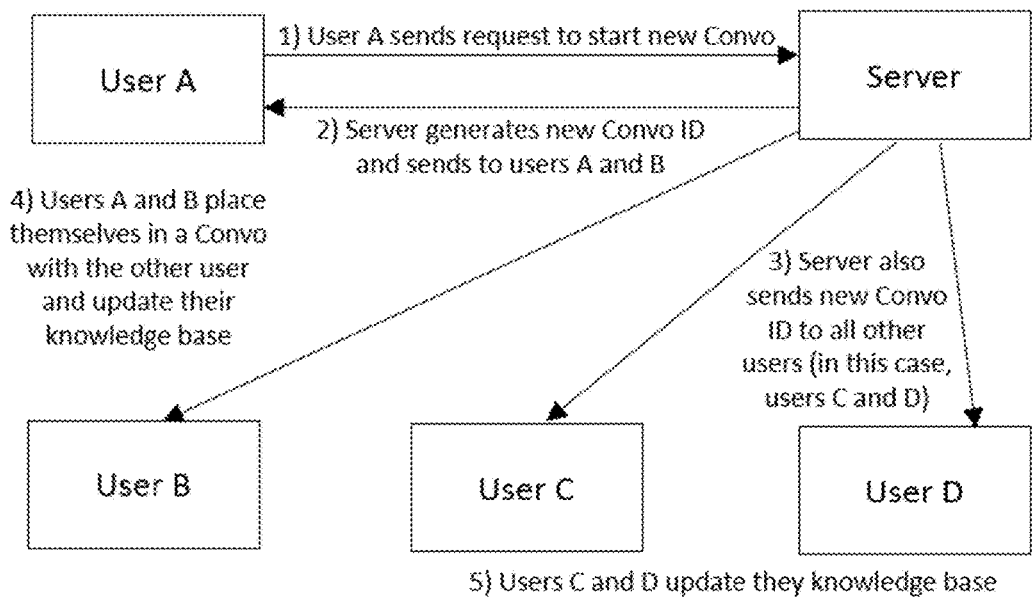
FIG. 19 is a block diagram of starting a convo in a client-server implementation.

B) Client-server implementation: User A would send a request to the Server to start a new Convo with User B. The Server would check its knowledge base to verify that neither User A nor User B are currently in a Convo. Upon successfully verifying, the Server would create a new Convo object (represented by a unique ID) containing Users A and B and would send that ID out to both Users A and B instructing them to place themselves in a Convo and who the other user is in that Convo. Upon receiving the instructions from the Server, Users A and B would both place themselves in a Convo with the other user communicated by the Server. Both users are now in a new Convo with the other user and they both have the same Convo ID for that Convo object. The Server also updates its own knowledge base with the new Convo ID and which users it contains. Along with the completion of this process, the Server would also send out a communication to all other users in the same session letting them know that there is a new Convo object, providing the ID for that object, and that it contains Users A and B. All other users would then update their knowledge base with the new information. See, FIG. 19.

Technical Implementation: Joining a Convo

For User A to join an existing Convo containing other users (say, users B and C), a 'Join Convo' mechanism may be triggered by any number of potential actions or events as outlined earlier in this document. Once this trigger occurs, the implementations for peer-to-peer and client-server might be as follows:

A) Peer-to-peer implementation: User A would already have in its knowledge base (updated prior to this) that users B and C are in a Convo and what the Convo ID is. User A would place themselves inside the Convo with users B and C, and send a communication to both users B and C that User A is joining that Convo with the same ID. Upon receiving the communication, users B and C would update their Convo to include User A. User A would also send out a communication to all other users in the same session letting them know that that Convo object with that Convo ID now also includes User A, and all other users would update their knowledge base with the new information.

It's important to note that a pure peer-to-peer implementation such as above might be subject to race conditions if no additional safeguards are taken. A race condition arises when the correct operation of a program or algorithm is dependent on the right sequence or timing of certain processes. For example, if User D joined the Convo between users B and C at the same time, or close to the same time, as User A, then potentially we could end up with inconsistent versions of the Convo object where:

Some users receive the message from User A before the message from User D. As a result, they may accept the request from User A to join the Convo, and may then reject the request from User D to join an existing Convo of users B and C because by the time that message is received, the Convo from those users' perspective now contains users A, B, and C (so it is impossible to add User D to a Convo of users B and C since that Convo no longer exists).

Other users receive the message from User D before the message from User A. As a result, they may accept the request from User D to join the Convo, and may then reject the request from User A to join an existing Convo of users B and C because by the time that message is received, the Convo from those users' perspective now contains users B, and C, D.

To resolve these and other types of race conditions, an extra handshake or verification step may be added such that a user (such as User B or C, or some other user) serves as the arbiter and confirms to either User A or User D that they are allowed to join the Convo before they join, and using that as a forcing function to prevent two or more changes happening concurrently. Alternatively, a client-server implementation may resolve race conditions by using the Server as the arbiter and single source of truth regarding Convo objects.

B) Client-server implementation: User A would already have in its knowledge base (updated prior to this) that users B and C are in a Convo and what the Convo ID is. User A would send a request to the Server to join the Convo. To prevent race conditions, the Server would first verify that no other users are in the process of joining or exiting the same Convo, or in the process of starting a Convo with User A. Upon verifying, the Server would add User A to the same Convo object and send an update to all users in the session that User A is now a part of that Convo. Upon receiving the update, User A would place themselves in the Convo with users B and C.

Users B and C would place User A in that Convo.

All other users would update their knowledge base with the new information.

Technical Implementation: Exiting a Convo

For User A to exit an existing Convo, an 'Exit Convo' mechanism may be triggered by any number of potential actions or events, such as those previously outlined in this document. Once this trigger occurs, the implementations for peer-to-peer and client-server might be as follows:

A) Peer-to-peer implementation: User A would send a communication to all other users in the session that User A is exiting the Convo object, along with the Convo ID. User A would then remove themselves from the Convo. Upon receiving the communication from User A:

Other users who were in the same Convo as User A would remove User A from their Convo. If there was only one other user in a Convo with User A, then that user may remove themselves from the Convo and terminate the Convo object.

Users who were not in the same Convo as User A would update their knowledge base such that the Convo object no longer contains User A. If there were only two users in that Convo object prior to User A exiting, the Convo object may be terminated and neither user would belong to a Convo any longer.

B) Client-server implementation: User A would send a communication to the Server that User A is exiting the Convo object, along with the Convo ID. User A would then remove themselves from the Convo. Upon receiving the communication from User A, the Server would update the Convo object in its knowledge base such that it no longer contains User A. If there were only two users in that Convo object prior to User A exiting, the Convo object may be terminated and neither user would belong to a Convo any longer. The Server would then send the update to all other users in the session with the new information. Upon receiving the communication from the Server, all users would update their knowledge base and Convo objects accordingly.

Technical Implementation: Maintaining Objective Positioning for a Convo

Within the virtual world, all users are arranged in a pattern, such as a circle. As a result, as users start Convos, or the number of users in a Convo increases or decreases, the positioning of all the users in that Convo might need to be updated so that they are again arranged in the desired pattern (e.g., a circle) and facing in a desired direction (e.g., facing the center of a circle).

Figures 20A, 20B:
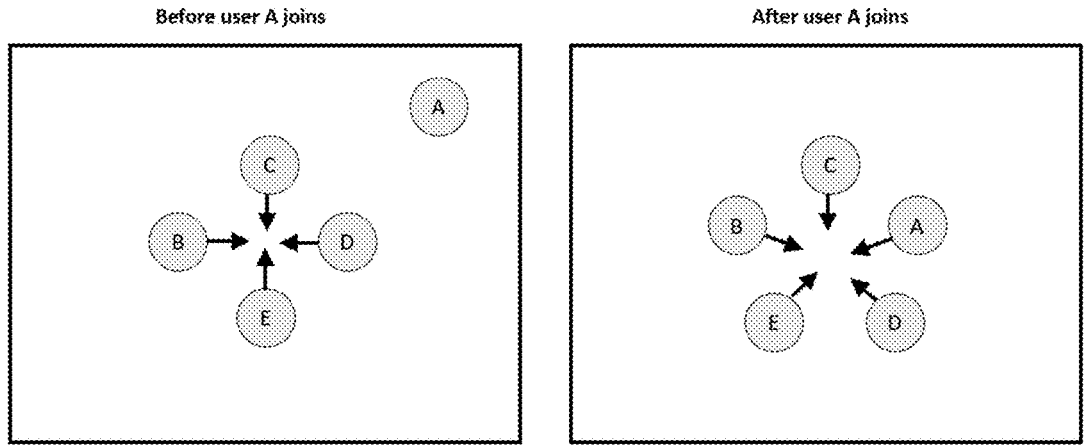
FIGS. 20A-20B are diagrams of a conversation before and after user A joins.

In FIGS. 20A-20B, FIG. 20A shows how User B, C, D, and E might be placed and arranged prior to User A joining a Convo, and FIG. 20B shows how they might need to be moved and reoriented after User A joins the Convo.

In order to do this, a set of calculations might need be performed every time there is a change in the number of users in a Convo, taking into account the following inputs: (i) Number of users in that Convo and their positions prior to the calculation; and (ii) Changes (adding or removing a user, and which user).

The output of the calculation might then include the users' new positions and orientations. The implementation for peer-to-peer and client-server might be as follows.

Figure 21:
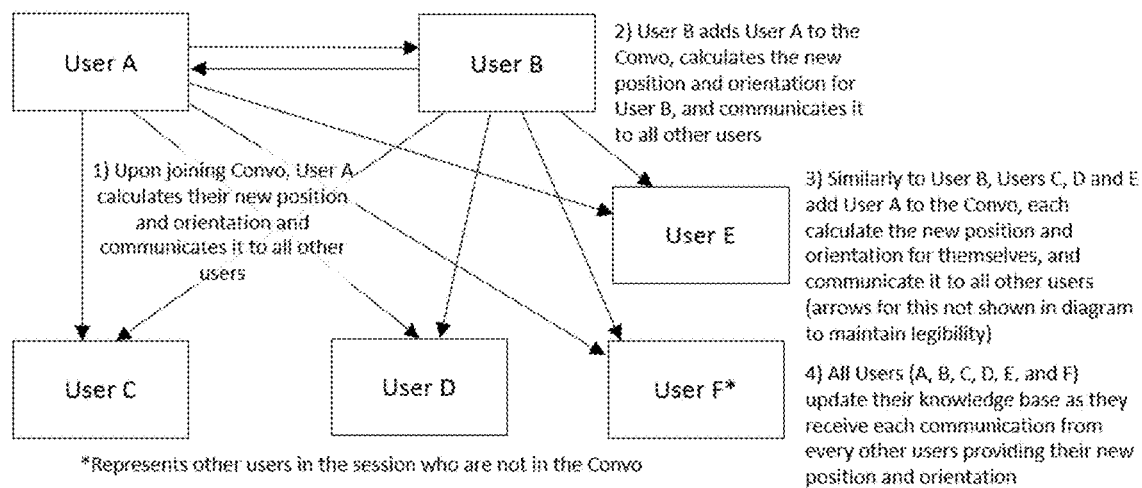
FIG. 21 is a block diagram depicting the new positions and orientations within a Convo in a peer-to-peer implementation.

Peer-to-peer implementation: In a peer-to-peer implementation, we would have each user in a Convo perform these calculations independently. Given the same set of inputs and the same arithmetic to be applied, each user would arrive at the same output on their own and then position and turn themselves accordingly. In the example above, upon User A joining, User C would calculate User C's new position and orientation, User D would calculate User D's new position and orientation, and so on. Upon each user completing their own calculation, they would communicate their new position and orientation out to all other users in the session so that they can update their knowledge base. One way this may be implemented is shown in FIG. 21.

Client-server implementation: In a client-server implementation, the Server would perform the calculation once and communicate out the new positions and orientations to all other users. In the example above, upon User A joining, the Server would calculate new positions and orientations for Users A, B, C, D and E, and would then send those out to all users. Upon receiving the information from the Server:

Users A, B, C, D and E would move and turn themselves according to the new information.

All other users would update their knowledge base.

Figure 22:
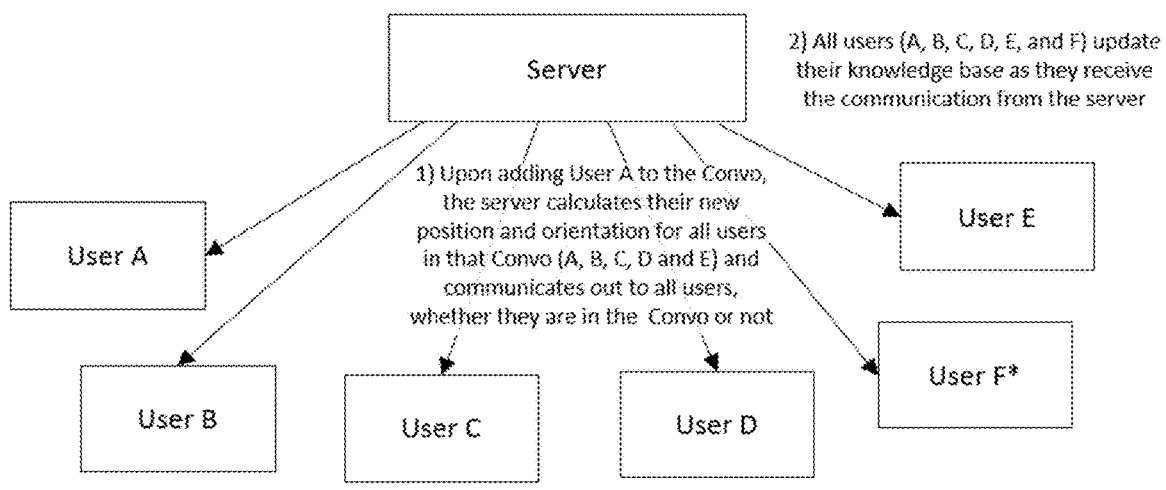
FIG. 22 is a block diagram depicting the new positions and orientations within a Convo in a client-server implementation.

One way this may be implemented is shown in FIG. 22.

Technical Implementation: Starting a Sidebar

For User A to start a new Sidebar with User B (who is in the same Convo as User A), a 'Start Sidebar' mechanism may be triggered by any number of potential events as outlined earlier in this document. Once this trigger occurs, the implementations for peer-to-peer and client-server might be as follows.

Peer-to-peer implementation: User A would send a request to User B to start a new Sidebar with User A. Upon receiving the request, User B would verify that they are not already in another Sidebar and then create a new Sidebar object (represented by a unique ID) and would send that ID back to User A confirming the start of a new Sidebar between A and B. User B would then place themselves in a Sidebar with User A. Upon receiving the confirmation and the ID from User B, User A would also place themselves in a Sidebar with User B. Both users are now in a new Sidebar with the other user and they both have the same Convo ID for that Convo object. Along with the completion of this process, either User A or User B would send out a communication to all other users in the same session letting them know that there is a new Sidebar object, providing the ID for that object, and that it contains users A and B. All other users would update their knowledge base with the new information.

Client-server implementation: User A would send a request to the Server to start a new Sidebar with User B. The Server would check its knowledge base to verify that User B is not currently in a Sidebar. Upon successfully verifying, the Server would create a new Convo object (represented by a unique ID) containing users A and B and would send that ID out to both users A and B instructing them to place themselves in a Sidebar and who the other user is in that Sidebar. Upon receiving the instructions from the Server, users A and B would both place themselves in a Sidebar with the other user. Both users are now in a new Sidebar with the other user and they both have the same Sidebar ID for that Sidebar object. The Server also updates its own knowledge base with the new Sidebar object and which users it contains. Along with the completion of this process, the Server would also send out a communication to all other users in the same session letting them know that there is a new Sidebar object, providing the ID for that object, and that it contains users A and B. All other users would update their knowledge base with the new information.

Technical Implementation: Joining a Sidebar

For User A to join an existing Sidebar containing other users (say, users B and C), a 'Join Sidebar' mechanism may be triggered by any number of potential events as outlined earlier in this document. Once this trigger occurs, the implementations for peer-to-peer and client-server might be as follows.

Peer-to-peer implementation: User A would already have in its knowledge base (updated prior to this) that users B and C are in a Sidebar and what the Sidebar ID is. User A would place themselves inside the Sidebar with users B and C, and send a communication to both users B and C that User A is joining that Sidebar with the same ID. Upon receiving the communication, users B and C would update their Sidebar to include User A. User A would also send out a communication to all other users in the same session letting them know that that Sidebar object with that Sidebar ID now also includes User A, and all other users would update their knowledge base with the new information.

Client-server implementation: User A would already have in its knowledge base (updated prior to this) that users B and C are in a Sidebar and what the Sidebar ID is. User A would send a request to the Server to join the Sidebar. To prevent race conditions, the Server would first verify that no other users are in the process of joining or exiting the same Sidebar, or in the process of starting a Sidebar with User A. Upon verifying, the Server would add User A to the same Sidebar object and send an update to all users in the session that User A is now a part of that Sidebar. Upon receiving the update, User A would place themselves in the Sidebar with users B and C Users B and C would place User A in that Sidebar All other users would update their knowledge base with the new information Technical Implementation: Exiting a Sidebar For User A to exit an existing Sidebar, an 'Exit Sidebar' mechanism may be triggered by any number of potential events as outlined earlier in this document. Once this trigger occurs, the implementations for peer-to-peer and client-server might be as follows.

Peer-to-peer implementation: User A would send a communication to all other users in the session that User A is exiting the Sidebar object, along with the Sidebar ID. User A would then remove themselves from the Sidebar. Upon receiving the communication from User A:

Other users who were in the same Sidebar as User A would remove User A from their Sidebar. If there was only one other user in a Sidebar with User A, then that user may remove themselves from the Sidebar and terminate the Sidebar object.

Users who were not in the same Sidebar as User A would update their knowledge base such that the Sidebar object no longer contains User A. If there were only two users in that Sidebar object prior to User A exiting, the Sidebar object may be terminated and neither user would belong to a Sidebar any longer.

Client-server implementation: User A would send a communication to the Server that User A is exiting the Sidebar object, along with the Sidebar ID. User A would then remove themselves from the Sidebar. Upon receiving the communication from User A, the Server would update the Sidebar object in its knowledge base such that it no longer contains User A. If there were only two users in that Sidebar object prior to User A exiting, the Sidebar object may be terminated and neither user would belong to a Sidebar any longer. The Server would then send the update to all other users in the session with the new information, all users would update their knowledge base and Convo objects accordingly.

While preferred embodiments of the present disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the disclosure. It is intended that the following claims define the scope of the disclosure and that methods and structures within the scope of these claims and their equivalents be covered thereby.

The invention claimed is:

1. A virtual communication system including logic for supporting layered conversations, the system comprising:
   at least two computers communicating to one another over a communications medium, where each computer represents a User;
   each computer of the at least two computers including a display, audio input, audio output, a camera, memory, data storage, a processor, a knowledgebase stored in memory;
   the knowledgebase containing an identifier identifying each conversation associated with a given user, the knowledgebase storing information identifying each participant in each of the conversations, the knowledgebase storing information identifying a type of each conversation associated with the given one of the at least two computers;
   where each User may participate in multiple simultaneous conversations over the virtual communications system using layered conversation logic executed by the processor, the layered conversation logic controlling a volume of User X2, X3, . . . XN on User X1's computer in accordance with the conversation type;
   wherein a given User may communicate with one or more other Users over the virtual communications system in the conversation type selected from the group Layer 1, Layer 2, and Layer 3, wherein $LC_{X1, X2, \ldots, XN}$ refers to a Layer C communication between Users X1, X2, . . . XN,
   wherein if User X1 is in a Layer 1 conversation with User X2 then User X1 is not in Layer 2 or Layer 3 conversation with User X2;
   wherein if User X1 is in Layer 2 conversation with User X2 then User X1 is in both Layer 1 and Layer 2 conversations with User X2 but User X1 is not in a Layer 3 conversation with User X2; and
   wherein if User X1 is in a Layer 3 conversation with User X2 then User X1 and User X2 are in Layer 1, Layer 2 and Layer 3 conversations together,
   wherein the layered conversation logic scales the volume of User X2 on computer X1 in conversation $L1_{X1,X2}$ to $S_{1,2}\%$ volume where $S_{1,2}$ is a scaling factor.

2. The virtual communication system of claim 1, wherein if User X1 is in $L2_{X1,X3}$ then the layered conversation logic adjusts the volume of User X3 on computer X1 to $S_{1,3}\%$ volume and scales the volume of User X2 on computer X1 in conversation $L1_{X1,X2}$ to $S_{1,2}\%$ volume, where $S_{1,3}$ and $S_{1,2}$ are scaling factors and $S_{1,3} > S_{1,2}$.

3. The virtual communication system of claim 2, wherein if the User X1 is in $L3_{X1,X4}$ then the layered conversation logic adjusts the volume of User X4 on computer X1 to $S_{1,4}\%$ volume, scales the volume of User X3 on computer X1 in conversation $L2_{X1,X3}$ to $S_{1,3}\%$ volume, and scales the volume of User X2 on computer X1 in conversation $L1_{X1,X2}$ to $S_{1,2}\%$ volume, where $S_{1,3}$, $S_{1,2}$ and $S_{1,4}$ are scaling factors and $S_{1,4} > S_{1,3} > S_{1,2}$.

4. The virtual communication system of claim 1, wherein any User in conversation $L1_{X1, X2, X3, \ldots XN}$ may invite one or more Users of conversation $L1_{X1, X2, X3, \ldots XN}$ to participate over the virtual communications system in conversation $L2_{X1, X2, X3, \ldots XN-1}$ contemporaneously with conversation $L1_{X1, X2, X3, \ldots XN}$.

5. The virtual communication system of claim 1, wherein any User in conversation $L2_{X1, X2, X3, \ldots XN}$ on the virtual communications system may invite one or more Users of conversation $L2_{X1, X2, X3, \ldots XN}$ on the virtual communications system to participate in conversation $L3_{X1, X2, X3, \ldots XN-1}$ on the virtual communications system contemporaneously with conversation $L2_{X1, X2, X3, \ldots XN}$ on the virtual communications system and conversation $L1_{X1, X2, X3, \ldots XN}$ on the virtual communications system.

6. The virtual communication system of claim 1, wherein any User in conversation $L1_{X1, X2, X3, \ldots XN}$ on the virtual communications system may join conversation $L2_{X1, X2, X3, \ldots XN-1}$ on the virtual communications system contemporaneously with conversation $L1_{X1, X2, X3, \ldots XN}$ on the virtual communications system.

7. The virtual communication system of claim 1, wherein any User in conversation $L2_{X1, X2, X3, \ldots XN}$ on the virtual communications system may join conversation $L3_{X1, X2, X3, \ldots XN-1}$ on the virtual communications system contemporaneously with conversation $L1_{X1, X2, X3, \ldots XN}$ on the virtual communications system.

8. The virtual communication system of claim 1, wherein the volume of User Y on User X's computer may be further scaled by a scaling factor $D_{X,Y}$ in proportion to a virtual separation between User X and User Y within the virtual communication system.

9. The virtual communication system of claim 1, wherein the volume of User Y on User X's computer may be further scaled by a scaling factor $E_{X,Y}$ in proportion to the facing orientation of User X relative to user Y within the virtual communication system.

10. The virtual communication system of claim 1, wherein the volume of User Y on User X's computer may be further scaled by a scaling factor $F_{X,Y}$ in proportion to the facing orientation of User Y relative to user X within the virtual communication system.

11. The virtual communication system of claim 1, wherein the volume of User Y on User X's computer may be further scaled by a scaling factor $G_{X,Y}$ in proportion to the volume scaling preferences of user X on the virtual communications system.

12. The virtual communication system of claim 1, wherein the layered conversation logic controls the volume and a visual layout of each participant in each conversation in which the User participates over the virtual communications system in accordance with the conversation type.

13. The virtual communication system of claim 1, wherein users belonging to a given Layer 2 conversation are objectively positioned in a virtual space at a predefined distance, orientation and layout in relation to each other.

14. The virtual communication system of claim 13, further including visual indicators indicating users belonging to the given Layer 2 conversation.

15. The virtual communication system of claim 1, wherein users in the given Layer 2 conversations are subjectively positioned in a virtual space within the virtual communications system according to a predefined distance, orientation and layout in relation to each other.

16. The virtual communication system according to claim 15, wherein visual indicators indicate users belonging to the same Layer 2 conversation.

17. The virtual communication system of claim 1, wherein users belonging to a given Layer 3 conversation are objectively positioned in a virtual space within the virtual communications system at a specified distance, orientation and layout in relation to each other.

18. The virtual communication system of claim 17, wherein visual indicators indicate users belonging to the given Layer 3 conversation.

19. The virtual communication system of claim 1, wherein every user in a Layer 3 conversation is subjectively positioned in a virtual space within the virtual communications system according to a predefined distance, orientation, and layout in relation to other users in the Layer 3 conversation.

20. The virtual communication system according to claim 19, wherein visual indicators indicate users belonging to the given Layer 3 conversation.

* * * * *